United States Patent [19]

Bivens

[11] Patent Number: 5,518,223
[45] Date of Patent: May 21, 1996

[54] AIR DAMPER ASSEMBLY WITH PISTON SEAL AND PISTON ROD LATCH

[75] Inventor: Steven L. Bivens, Kankakee, Ill.

[73] Assignee: Illinois Tool Works Inc., Glenview, Ill.

[21] Appl. No.: 368,152

[22] Filed: Dec. 29, 1994

[51] Int. Cl.⁶ .............................. B60G 11/56; E05F 3/00; F16F 9/50
[52] U.S. Cl. .................. 267/34; 267/221; 267/64.12; 188/282; 188/322.18; 188/300; 16/66; 16/84
[58] Field of Search ..................... 188/270, 281, 188/282, 300, 301, 322.18, 322.15, 322.22; 267/64.12, 64.14, 34, 221, 226; 16/66, 84, DIG. 10, DIG. 17, DIG. 21

[56] References Cited

U.S. PATENT DOCUMENTS

| | | | |
|---|---|---|---|
| 2,497,425 | 2/1950 | Terry | 126/285 |
| 4,248,444 | 2/1981 | Johnson | 280/47.11 |
| 4,428,567 | 1/1984 | Fournales | 267/64.26 |
| 4,629,167 | 12/1986 | Kimura et al. | 16/66 X |
| 4,877,115 | 10/1989 | Bauer et al. | 188/322.18 X |
| 4,938,324 | 7/1990 | Van Dyke | 188/317 |
| 4,948,103 | 8/1990 | Bowden et al. | 16/84 X |
| 5,163,204 | 11/1992 | Jackson | 16/84 |
| 5,165,124 | 11/1992 | Li | 5/100 |
| 5,220,706 | 6/1993 | Bivens | 16/66 |
| 5,265,710 | 11/1993 | Gabas et al. | 192/111 A |

FOREIGN PATENT DOCUMENTS

| | | | |
|---|---|---|---|
| 2144 | 5/1979 | European Pat. Off. | 188/281 |
| 253072 | 1/1988 | European Pat. Off. | 188/281 |
| 2666857 | 3/1992 | France | 188/281 |

*Primary Examiner*—Josie Ballato
*Attorney, Agent, or Firm*—Schwartz & Weinrieb

[57] ABSTRACT

An air damper assembly for controlling the dampening rate of an openable object includes a piston head having a molded channel therein and a lip seal member disposed around the connecting member of the piston head to form a continuous seal therebetween. The piston head is formed of a pair of axially spaced-apart first and second circular plate members which are connected by the connecting member. The second circular plate member is formed of a diameter which is smaller than the diameter of the first circular plate member so as to allow the outer peripheral portion of the lip seal member to collapse and become disengaged from the inner peripheral sidewall of the housing member.

30 Claims, 3 Drawing Sheets

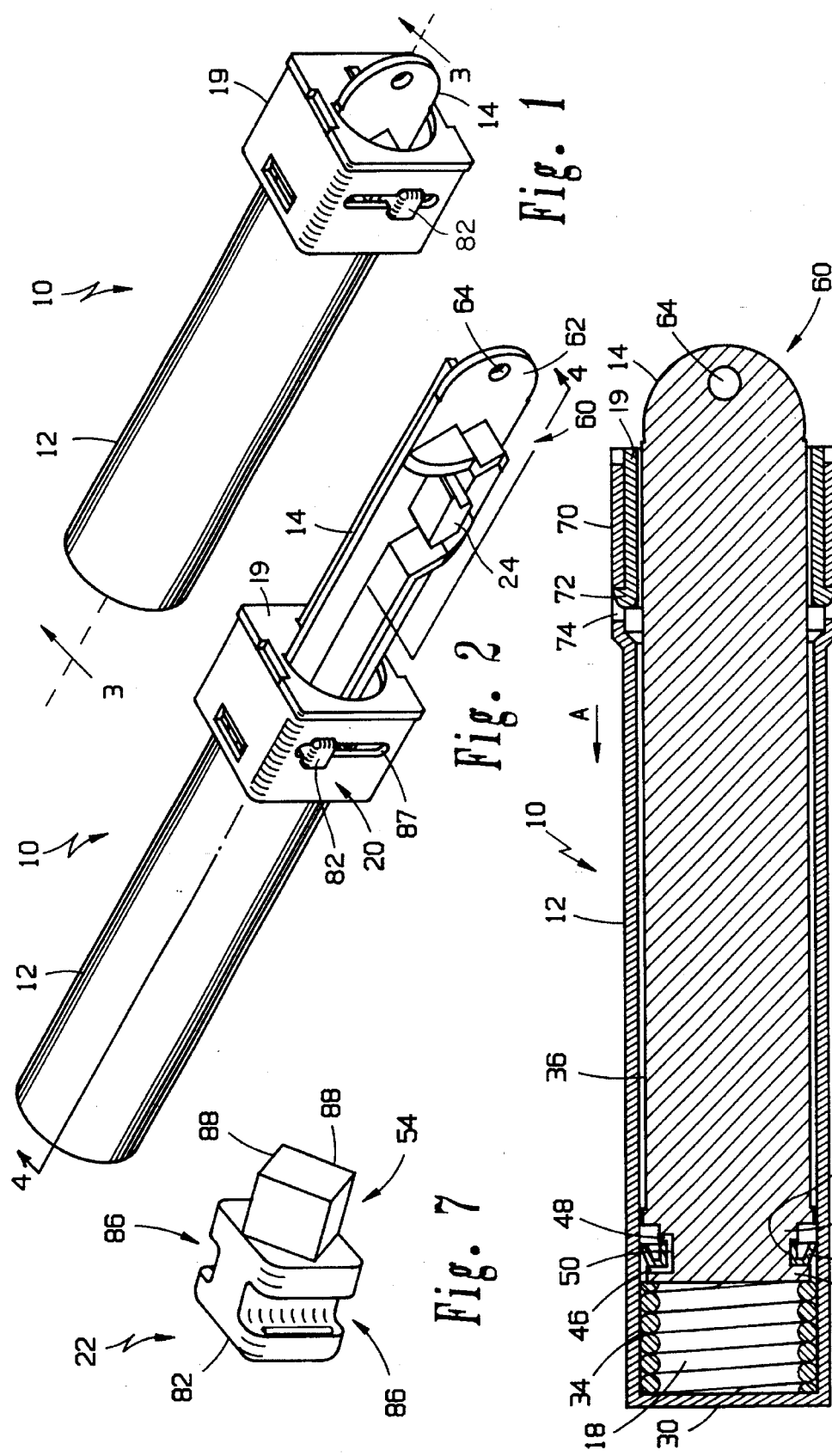

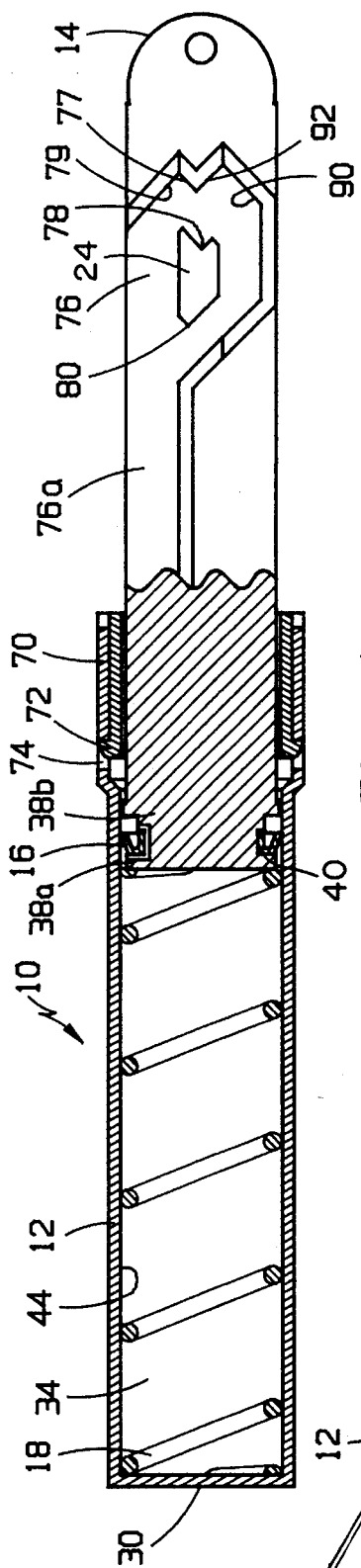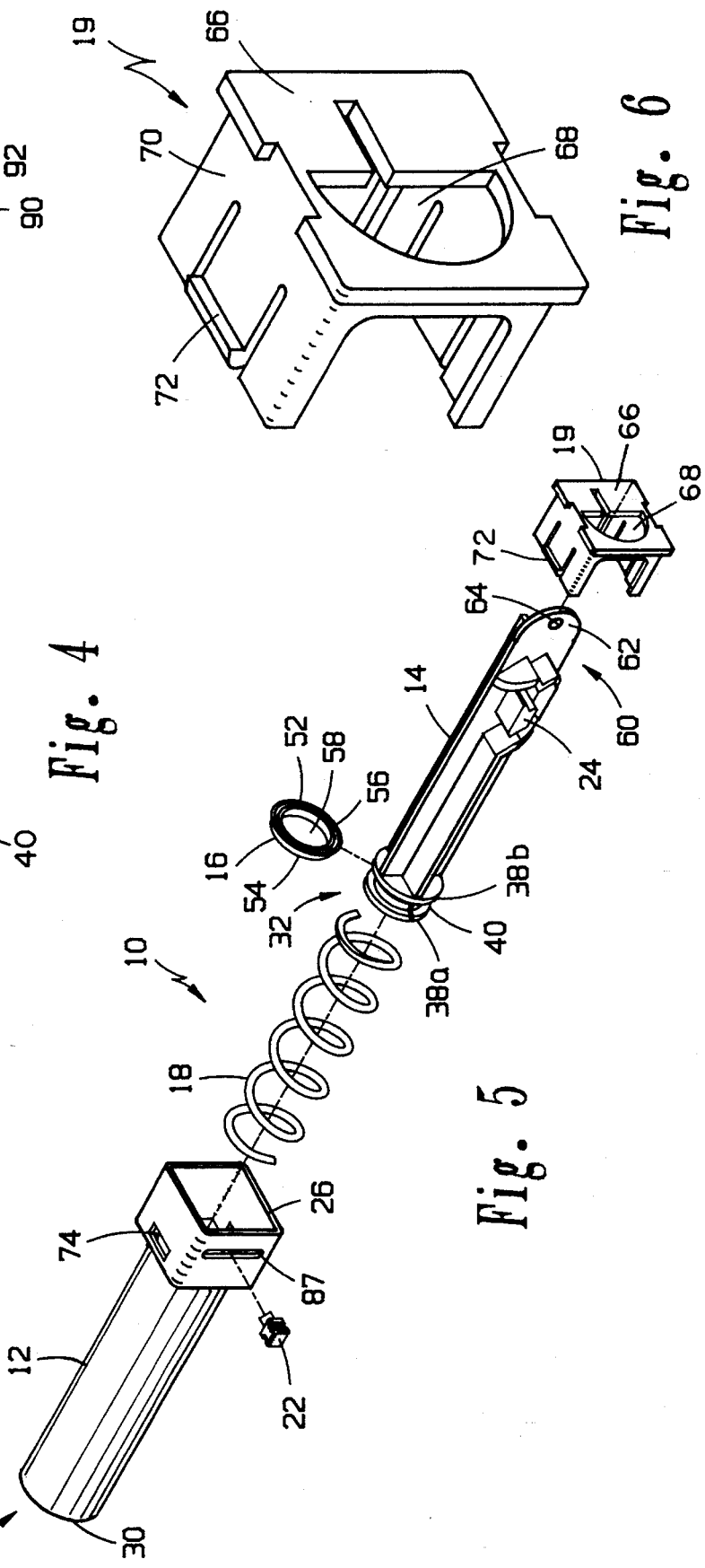

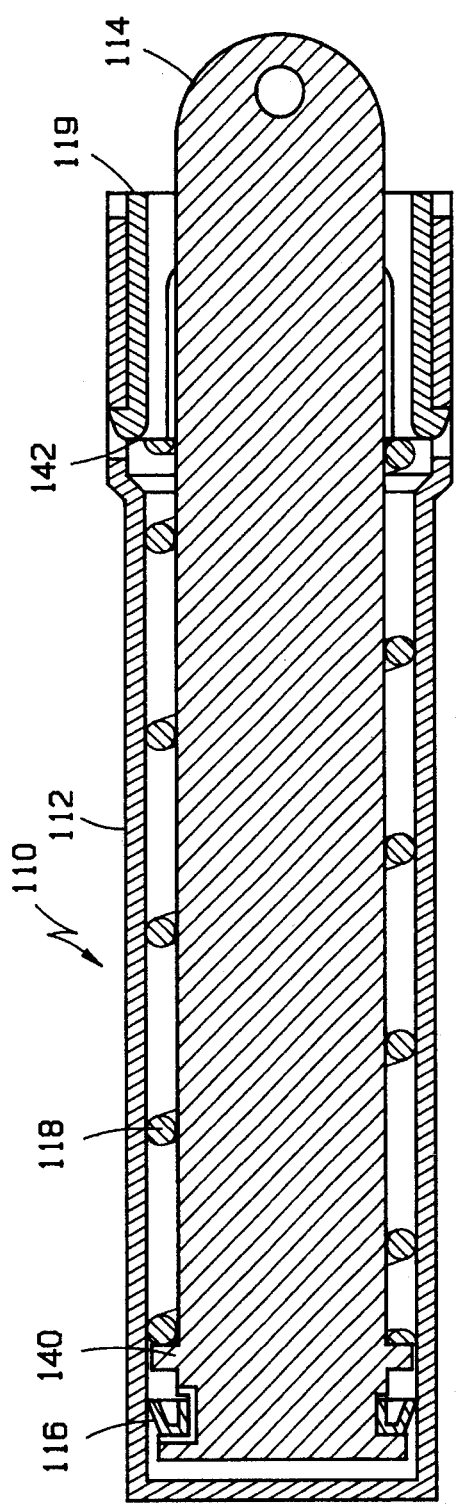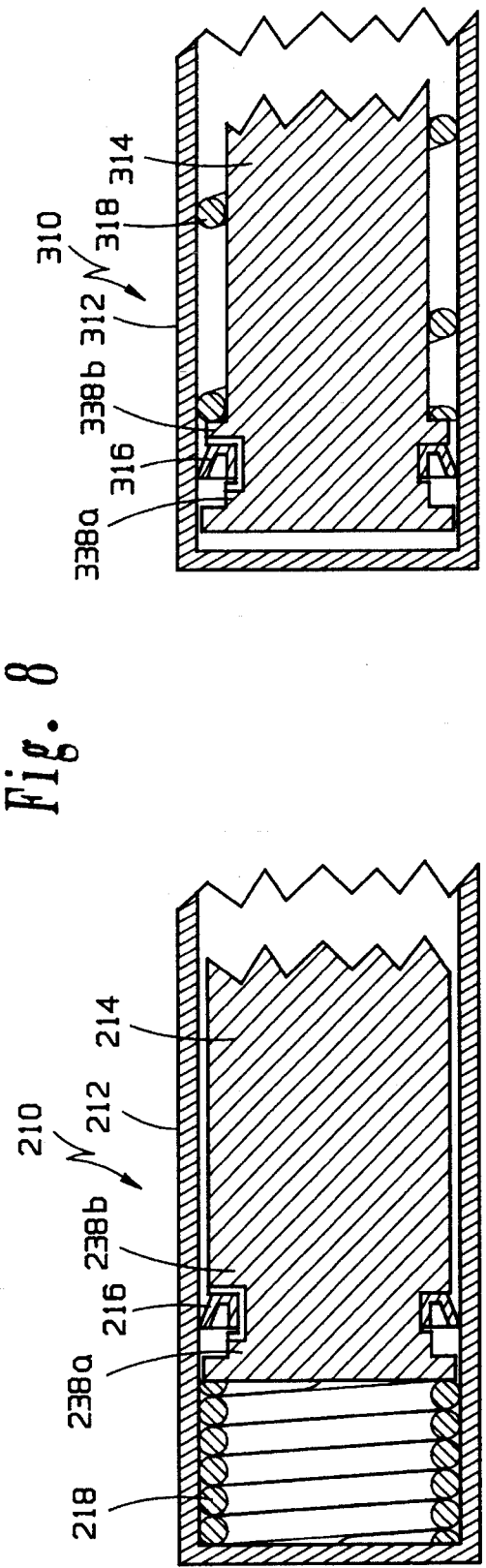

AIR DAMPER ASSEMBLY WITH PISTON SEAL AND PISTON ROD LATCH

BACKGROUND OF THE INVENTION

1. Field of the Invention

This invention relates generally to damper devices for controlling the opening rate of an openable object such as a cup holder, ashtray, glove compartment door, or the like relative to a main body. More particularly, the present invention relates to an improved air damper assembly which includes a piston head having a molded channel therein and a lip-like seal member disposed around the connecting member of the piston head so as to form a continuous seal therebetween an thereby control the dampening rate of the openable object.

2. Description of the Prior Art

As is generally well-known in the art, if an openable object is allowed to abruptly open relative to its main body the impact between them may not only cause damage to occur so as to possibly destroy both of them, but can also produce vibration and noise which may cause the contents stored within the openable object to fall out and become scattered. When the openable object is, for instance, a glove compartment door mounted in the dashboard of an automotive vehicle, the sudden impact opening may cause the items therein to be tossed or thrown all over the passenger, seat, and floor of the car. It will be appreciated that similar problems can also occur when the openable object is an ashtray, cup holder, and the like.

A state-of-the-art search directed to the subject matter of this application in the U.S. Patent and Trademark Office uncovered the following U.S. Letters Patent:

| | |
|---|---|
| 2,497,425 | 5,163,204 |
| 4,248,444 | 5,165,124 |
| 4,428,567 | 5,220,706 |
| 4,938,324 | 5,265,710 |

There is disclosed in U.S. Pat. No. 4,428,567 to J. P. Fournales issued on Jan. 31, 1984, a combined shock absorber and suspension device for a vehicle which includes an annular flexible lip 39 and a bypass conduit 40 formed within the piston 17 and bores 20. During expansion of the device when the piston moves in the direction of the arrow F, the lip 39 contacts the interior peripheral wall of the cylinder 1 and the fluid in the space 41 can only flow in the bypass conduit 40 and the bores 20. On the other hand, during compression of the device when the piston moves in the direction opposite the arrow F the lip 39 is retracted so as to allow the fluid to bleed past the lip 39 and through the annular space defined between the outer surface of the lip and the internal peripheral wall of the cylinder 1 and into the space 41, as well as through the bores 20.

There is disclosed in U.S. Pat. No. 4,938,324 to L. J. Van Dyke issued on Jul. 3, 1990, an automatic derailleur shifter for a bicycle which includes a movable piston 42 and a resilient, radially outwardly flared skirt 74 seated thereon. When the piston 42 is moved downwardly in the direction of the arrow 86, the flared skirt 74 of the annular seal will scrape against the inner peripheral wall of the cylinder 14 and all the fluid is forced through the annular fluid passage 68. When the piston 42 is moved upwardly in the direction of the arrow 78, the fluid will also pass through the passage 68 as well as bypassing over the flared skirt 74 through the clearance space 54 which is defined between the outer periphery of the fixed piston element 44 and the inner peripheral wall of the cylinder 14.

In U.S. Pat. No. 5,163,204 to C. B. Jackson issued on Nov. 17, 1992, there is taught a marine door movement control apparatus which includes a cylinder 21 and a piston 50 having seals 57, 58 seated thereon. An axial orifice 63 is provided which extends longitudinally through the piston 50. A radial orifice 64 is provided which communicates between a through-hole 51 in the piston 50 and the space 59 between the seals 57 and 58. The radial orifice 64 functions only when the piston 50 is moved in the direction of the arrow 62. Thus, when the piston 50 is moved in the direction of the arrow 62, fluid flows through both the orifices 64 and 63. However, when the piston is moved in the direction of the arrow 61, fluid can only flow through the orifice 63.

In U.S. Pat. No. 2,497,425 to A. P. Terry issued on Feb. 14, 1950, there is taught a flue damper which includes a cam track 12 and a cam follower pin 13 disposed on a stem member 11. A latching mechanism is formed of a sector-shaped latch 24 and a catch 26 in which the latch 24 is arranged to engage when the latch is directed inwardly of the flue.

In U.S. Pat. No. 4,248,444 to P. C. Johnson issued on Feb. 3, 1981, there is described a steering mechanism for a hospital-type carriage such as a four-wheeled mobile stretcher which includes a cam slide 62 in a mechanism for quickly disconnecting a caster of the carriage from a chain so as to render it freely swivelable. The cam slide 62 has an irregular, closed slot-type cam recess 64 formed therein which is used to receive a pin-like projection 66. The engagement of the projection 66 with the various surfaces of the inner portion 68 of the slide 62 will move the cam slide in various transverse directions.

In U.S. Pat. No. 5,165,124 to H. Li issued on Nov. 24, 1992, there is described a lifting gate controlling mechanism for controlling the front lifting gate of a baby's crib. The lifting gate is movably held by a pair of upper sliding blocks 6 and a pair of lower sliding blocks 7. Each of the upper sliding blocks 6 is secured to a respective upper mounting bar 4 for holding the lifting gate. A P-shaped sliding track 42 is formed on the front face of the mounting bars 4. A sliding rod 63 is joined at its one end to the lower end of the sliding block 6 and has an opposite end which is inserted in the sliding track 42 and moved slidably therein.

Further, there is shown in U.S. Pat. No. 5,265,710 to Gabas et al. issued on Nov. 30, 1993, a hydraulic self-adjusting housing for clutch control cables which is formed with a main housing CP. The housing has a longitudinal passage 4 through which communication may be established between the chambers C1 and C2. An adjusting rod VR has a front end attached to the cable linked with the clutch pedal and a second end attached to the piston formed by shut-off valve VC. A control spring RR permanently pulls against the cable through the rod VR.

Finally, there is disclosed in U.S. Pat. No. 5,220,706 to S. L. Bivens issued on Jun. 22, 1993, and assigned to the same assignee as in the present invention an air damper utilizing only recirculating internal air for dampening in one direction the movement of an openable object. This U.S. Pat. No. '706 patent is hereby incorporated by reference. The air damper includes inner and outer cylinder members, primary and secondary shafts, first and second controllable orifice structures, primary and secondary end caps, and primary and secondary compression springs.

Heretofore, there have been attempts made in the prior art to provide damper devices for absorbing the impact created between the main body and the openable object so as to avoid these types of problems. Some of these prior art damper devices suffer from the disadvantage that they require the use of a small vent hole formed in the endwall of the damper housing. As a result, these prior art devices are susceptible to the problem that foreign material from the outside environment can plug or block the vent holes so as to eliminate the dampening effect. Further, these existing designs are typically constructed of a piston rod having a pair of axially spaced-apart disc-like members which are formed integrally adjacent its front end and which are connected by a connecting member of reduced diameter, and a lip seal disposed around the connecting member for slidable movement between the disc-like members. Since there is not a continuous seal between the inner diameter of the lip seal and the outer diameter of the connecting member, there will be experienced a slight jump or jerking motion during the initial release of the openable object while a seal is being created between the outer surface of the lip seal and the inner surface of one of the disc-like members.

There is also known in the prior art a damper device having a "push-push" type of locking device formed by means of a heart-shaped cam part, a follower pin, and a retaining clip as is shown and described in U.S. Pat. No. 4,948,103 to P. J. Bowden et al. issued on Aug. 14, 1990, and assigned to the same assignee as in the present invention. Since the follower pin follows the heart-shaped pattern and pivots from a fixed point, this type of existing design tends to cause latch inconsistencies and occasionally becomes disassembled during its operation. In particular, the latching malfunction will be mainly due to (1) skipping when the follower pin will completely skip the V-shaped portion of the cam part and thus no latching will occur, and (2) sticking when the follower pin will become stuck in the V-shaped portion of the cam part and thus unlatching will not occur.

It would therefore be desirable to provide an improved air damper assembly of a unique construction like that of the present invention which includes a piston head having a molded channel therein and a lip seal disposed around the connecting member of the piston head to form a continuous seal therebetween so as to control the dampening rate of openable objects. It would also be expedient to provide an air damper assembly with a one-piece diamond-shaped latching member encapsulated by the damper housing so as to prevent disassembly during its operation. The latching member in the damper assembly of the present invention represents a significant improvement over the locking device described in the above-mentioned U.S. Pat. No. '103 patent.

SUMMARY OF THE INVENTION

Accordingly, it is a general object of the present invention to provide an improved air damper assembly for controlling the dampening rate of an openable object which is relatively simple and economical to manufacture and assemble, but yet overcomes the disadvantages of the prior art damper devices.

It is an object of the present invention to provide an improved air damper assembly for controlling the dampening rate of an openable object which includes a piston head having a molded channel therein and a lip seal member disposed around the connecting member of the piston head so as to form a continuous seal therebetween.

It is another object of the present invention to provide an improved air damper assembly which includes a one-piece diamond-shaped latching member encapsulated by the damper housing so as to prevent disassembly during its operation.

It is still another object of the present invention to provide an improved air damper assembly which includes a piston head formed of a pair of axially spaced-apart first and second circular plate members, the second circular plate member being formed of a diameter which is smaller that the diameter of the first circular plate member so as to allow the outer peripheral portion of the lip seal member to collapse.

In accordance with one preferred embodiment of the present invention, there is provided an improved air damper assembly which includes a cylindrically-shaped housing member having a closed end and an open end. A piston rod is reciprocally movably inserted into the housing member and includes at its front end a piston head telescopingly slidable along the interior wall of the housing member for dividing the same into a head chamber and a rod chamber. The piston head is formed of a pair of axially spaced-apart first and second circular plate members which are connected by a connecting member. A lip seal member is mounted tightly around the connecting member in an annular groove formed in the outer peripheral surface of the connecting member to form a continuous seal.

A first orifice is formed in a portion of the first circular plate, a second orifice is formed in a portion of the second circular plate, and a slot is formed in the circumference of the connecting member and extends throughout its entire length in the axial direction. The first and second orifices and the slot allow the flow of air to pass between the head chamber and the rod chamber in accordance with the movement of the piston rod in first and second axial directions. An end cap is fixedly secured in the open end of the housing member and has an annular flange with an opening for receiving the piston rod therethrough. A compressed coil spring is disposed within the housing and extends between the inner surface of the closed end thereof and the first circular plate member of the piston head so as to tend to push the piston rod outwardly.

The lip seal member has an outer peripheral portion thereof which engages an inner peripheral sidewall of the housing member only when the piston rod is pushed outwardly so as to move the piston rod in the first axial direction at a controllable rate of speed. The second circular plate member is formed of a diameter which is smaller than the diameter of the first circular plate member so as to allow the outer peripheral portion of the lip seal member to collapse and become disengaged from the inner peripheral sidewall of the housing member during movement of the piston rod in the second axial direction. As a result, the air trapped within the housing is allowed to escape between the outer peripheral portion of the lip seal member and the inner peripheral sidewall of the housing. Therefore, the movement of the piston rod in the second axial direction is achieved at an undampened higher rate of speed.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout the different views, wherein:

FIG. 1 is a perspective view of an air damper assembly constructed in accordance with the principles of the present invention, illustrating the components thereof in their fully retracted position;

FIG. 2 is a perspective view similar to FIG. 1, but illustrating the components thereof in their fully extended position;

FIG. 3 is a cross-sectional view, taken along the lines 3—3 of FIG. 1;

FIG. 4 is a cross-sectional view, taken along the lines 4—4 of FIG. 2;

FIG. 5 is an exploded, perspective view of the air damper assembly of FIG. 1;

FIG. 6 is a perspective view of the end cap of FIG. 5;

FIG. 7 is a perspective view of the one-piece latching member of FIG. 5;

FIG. 8 is a cross-sectional view, similar to FIG. 3, illustrating a second embodiment of the present invention;

FIG. 9 is a cross-sectional view, similar to FIG. 3, illustrating a third embodiment of the present invention; and FIG. 10 is a cross-sectional view, similar to FIG. 8, illustrating a fourth embodiment of the present invention.

DESCRIPTION OF THE PREFERRED EMBODIMENTS

Referring now in detail to the various views of the drawings, there is shown in FIGS. 1 through 5 an air damper assembly 10, constructed in accordance with the principles of the present invention for controlling the dampening rate of an openable object (not shown) such as a cup holder, ashtray, or glove compartment door installed in the interior of an automotive vehicle relative to a main body such as a cup holder housing (also not shown) mounted in a dashboard. In other words, the air damper assembly 10 is used to push out the object (open) at a dampened or controlled rate of speed when activated and to be pushed in (closed) at an undampened or higher rate of speed with a reduced force. As illustrated FIG. 1–5, the air damper assembly is comprised of a cylindrically-shaped housing member 12, a piston rod 14, a lip seal member 16, a coil spring 18, and an anti-twist end cap 19. The damper assembly also includes a uniquely designed latching member 20 formed by means of a one-piece diamond-shaped latch member 22 and a specially-designed cam part 24.

The cylindrically-shaped housing member 12 is open at its one or front end 26 and is closed at its other or rear end 28 by means of an endwall 30. The piston rod 14 is inserted reciprocally into the housing member 12. At the front end of the piston rod 14, there is provided a piston head 32 which is telescopingly slidable in the interior wall of the housing member for dividing the same into a head chamber 34 and a rod chamber 36. The piston head 32 is formed of a pair of axially spaced-apart circular plate members 38a and 38b which are connected by a round connecting member 40 of a reduced diameter. The lip seal member 16 is mounted tightly around the connecting member 40 in annular groove 42 formed in the outer peripheral surface of the connecting member.

The circular plate member 38a has a diameter which is smaller than the diameter of the inner sidewall 44 of the housing member 12. The outer diameter of the connecting member 40 is slightly larger than the inner diameter of the lip seal member 16 so as to create a continuous seal therebetween. In order to allow the lip seal member to collapse so as to eliminate unwanted dampening when the piston rod is moved in one axial direction, the diameter of the plate member 38b is made to be somewhat smaller than the diameter of the circular plate member 38a.

A first orifice 46 is formed in a portion of the circular plate member 38a, and a second orifice 48 is formed in a portion of the circular plate member 38b. The second orifice is made to be the same dimension as the first orifices. The first and second orifice are preferably molded directly into the respective plate members 38a and 38b. A U-shaped slot or channel 50 is preferably molded directly into the circumference of the connecting member 40 of the piston head and extends throughout its entire length in the axial direction so as to provide an air passage connected to the first and second orifices thereby defining an orifice means. The orifice means serves to permit a flow of air to pass between the head chamber 34 and the rod chamber 36 in accordance with the movement of the piston rod 14 in the first and second axial directions.

As can best be seen from FIGS. 3–5, the lip seal member 16 has a generally circular configuration and is preferably formed of an elastically formable material such as rubber, foam, or the like. The lip seal member is formed of a hollow annular portion 52 defining a closed back end 54 on its one side and an open end 56 on its other side. The lip seal member also has a central opening 58 whose diameter is slightly smaller than the diameter of the connecting member 40. The inner surface of the central opening 58 is disposed in surrounding relationship with the connecting member 40 so as to overlie the molded channel 50. Thus, the closed end 54 of the seal member abuts against the inner surface of the circular plate member 38a and the open end of the seal member abuts against one side of the circular plate member 38b.

The coil spring 18 is disposed between the endwall 30 of the housing member 12 and the other side of the plate member 38a of the piston head 32. One end of the compressed coil spring 18 is held by means of the inner surface of the endwall 30, and the other end of the coil spring is held by means of the outer surface of the plate member 38a. Adjacent to the other or rear end 60 of the piston rod 14, there is provided a flattened end portion 62 having an opening 64 which may be attached to the cup holder door. It should be noted that the closed end of the housing member 12 may be suitably provided with mounting means (not shown) for attachment to the sidewall of the cup holder housing in the dashboard of the automotive vehicle. In the alternative, the housing member 12 may be attached to the cup holder door and the piston rod 14 may be attached to the cup holder housing. In this manner, the cup holder door can be opened with a controlled dampening rate relative to the cup holder housing.

The opened or front end 26 of the housing member 12 receives the anti-twist end closure or cap 19. As can best be seen from FIGS. 5 and 6, the end cap 19 is formed so as to have a rectangular shape with its one end thereof closed by an annular flange 66. The annular flange is provided at its central portion with a cut-out 68 of a unique contour for receiving the piston rod 14 therethrough so as to form an anti-twist means so as to prevent the piston rod 14 from being rotated or twisted relative to the housing 12. It will be noted that the piston rod 14 is of a cruciform cross-section whose contour conforms to the cut-out 68 in the end cap 19.

Further, the end cap 19 is formed with annular marginal sections 70 each having a prong or projection 72. The prongs 72 are adapted to snappingly engage into rectangularly-shaped opposed openings 74 formed on the marginal portions adjacent the front end of the housing member 12 so as to fixedly secure the end cap 19 to the housing member 12.

The specially-designed cam part 24 of the latching device 20 is formed adjacent the rear end 60 of the piston rod 14.

The latch track 76 is disposed around the cam part 24 which has a V-shaped portion 78 arranged at its right end (FIG. 4) and a tip surface 80 positioned at its left end. The tip surface is formed adjacent to a longitudinally-extending track portion 76a formed within the outer surface of the piston rod. The one-piece latch member 22 has a rectangularly-shaped upper body portion 82 and a diamond-shaped lower body portion 84 formed integrally with the inner portion. The upper portion is formed with a pair of opposed U-shaped cut-outs 86 which are adapted to slide into a U-shaped slot 87 formed within the sidewall of the housing member 12 adjacent its front end thereof. As a result, the contact faces 88 of the diamond-shaped lower portion 84 interfaces and is retained movably to travel along the latch track 76.

The operation of the air damper assembly 10 of the present invention will now be described with reference to FIGS. 3 and 4 of the drawings. In the closed or fully retracted position, it will be noted that the coil spring 18 is compressed and the piston rod 14 is held or locked in place interiorly of the housing member 12 until motion is required. This is due to the fact that two of the contact faces 88 of the diamond-shaped lower portion 84 of the latch member is retained or locked within the V-shaped portion 78 of the cam part 24.

In order to activate the damper assembly 10, the rear end 60 of the piston rod 14 is pushed slightly to the left in the direction of the arrow A so that the piston rod is moved further into the housing 12 and is then released. As a consequence, the two contact faces 88 of the diamond-shaped lower portion 84 is caused to interface with the sidewalls 90, 92 thereby releasing or unlocking the piston rod 14. This permits the coil spring 18 to bring the opposing surfaces of the latch member 22 and the latch track 76 together so as to push the piston rod 14 outward from the housing member 22 in a linear motion. As the piston rod 14 is being pushed out, the diamond-shaped lower portion 84 of the latch member 22 will continue to slide along the track portion 76a as it contacts the sidewalls of the latch track 76. In this manner, the piston rod 14 will be caused to move from the closed position shown in FIG. 3 to the open position illustrated in FIG. 4.

As the piston rod 14 is moved to the right by means of the biasing force of the coil spring 18, the outer peripheral portion of the lip seal member 16 will engage the inner peripheral sidewall of the housing member 12 so as to eliminate all airflow from the head chamber 34 to the rod chamber 36 except through the first orifice 46 by means of the second orifice 48 and the molded channel 50 thus causing a vacuum. Therefore, the piston rod 14 is caused to move or slide to the right at a dampened or controlled rate of speed.

In order to return the air damper assembly to its closed position from the fully extended position of FIG. 4, the rear end 60 of the piston rod 14 is pushed to the left. In this fashion, the piston rod is moved into the housing and the diamond-shaped lower portion of the latching member 22 is caused to move initially along the latch track portion 76a. As the diamond-shaped lower portion of the latch member contacts the tip surface 80 of the cam part 24, it will then travel toward the right end of the cam track 76. As the piston rod 14 continues moving to the left, the contact faces 88 of the diamond-shaped lower portion 84 will come to rest against the track wall surfaces 77 and 79. Next, the end of the piston rod 14 is released. As this occurs, the contact surfaces of the diamond-shaped lower portion 84 of the latching member 22 is caused to engage with the V-shaped portion 78 of the cam part 24, thereby latching the piston rod 14 in the housing 12 as shown in FIG. 3.

As the piston rod 14 is pushed in or moved to the left, the outer peripheral portion of the sealed member 16 is allowed to collapse and will not engage the inner peripheral sidewall of the housing 12 due to the smaller diameter of the circular plate member 38b abutting the open end thereof. Therefore, the trapped air in the head chamber 34 is allowed to rush between the inner peripheral sidewall of the housing member 12 and the outer peripheral portion of the lip seal member and into the rod chamber 36 and then out the front end of the housing, thereby facilitating a quick closing of the damper assembly at an undampened higher rate of speed. Simultaneously, airflow will also pass from the head chamber 34 to the rod chamber 36 due to the second orifice 48, the molded channel 50, and the first orifice 46.

Referring now to FIG. 8, there is shown a second embodiment of the air damper assembly 110 of the present invention. The air damper assembly 110 includes a cylindrically-shaped housing member 112, a piston rod 114, a lip seal member 116, a coil spring 118, and an end cap 119. It should be noted that the damper assembly 110 is comprised of substantially the same components as the damper assembly 10 and functions in substantially the same manner. The only difference between the assemblies 110 and 10 is the piston head and the location of the coil spring 118. In the air damper assembly 110, the coil spring 118 is disposed around the piston rod 114 and is held between the rear surface of a disc-like member 140 and the inner surface 142 of the end cap 119 and not between the inner surface of the endwall 30 and the outer surface of the circular plate member 38a. The piston head 32 in the damper assembly 10 can be simply modified so as to include the disc-like member 140. During opening of the door, movement of the piston rod 114 to the right will also be opposed by the compression of the coil spring 118 so as to facilitate further the dampening effect.

Referring now to FIG. 9, there is shown a third embodiment of the air damper assembly 210 of the present invention. The air damper assembly 210 includes a cylindrically-shaped housing 212, a piston rod 214, a lip seal member 216, a coil spring 218, and an end cap, not shown. The only difference between the damper assemblies 210 and 10 is the position of the lip seal member 216. In the damper assembly 210, the opened end of the lip seal member 216 abuts against the side of the plate member 238a and not against the side of the plate member 238b. In operation, the door is allowed to freely fall upon its initial opening and the air damper assembly 210 serves to produce dampening at the end stroke when the door causes the piston rod 214 to compress the coil spring 218.

Referring now to FIG. 10, there is shown a fourth embodiment of the air damper assembly 310 of the present invention. The air damper assembly 310 includes a cylindrically-shaped housing member 312, a piston rod 314, a lip seal member 316, a coil spring 318, and an end cap, not shown. The only difference between the assemblies 310 and 110 is the position of the lip seal member 316. In the assembly 310, the opened end of the lip seal member 316 abuts against the side of the plate member 338a and not against the side of the plate member 338b. In operation, the door is allowed to again freely fall upon its initial opening and the damper assembly 310 serves to produce the dampening effect at the end stroke when the door causes the piston rod 314 to compress the coil spring 318.

The air damper assemblies of the present invention have the following advantages over the prior art:

(1) It creates a continuous seal between the inner diameter of the lip seal member and the outer surface of the connecting member of the piston head so as to eliminate the slight jump upon the initial opening of the door;

(2) It provides an air passage molded directly into the connecting member of the piston head which is encapsulated by the housing member, thereby preventing plugging of airflow due to foreign objects in the outside environment; and (3) It provides a one-piece diamond-shaped latching member which avoids latching malfunctions and prevents disassembly during its operation.

From the foregoing detailed description, it can thus be seen that the present invention provides an improved air damper assembly for controlling the dampening rate of an openable object which includes a piston head having a molded channel therein and a lip seal member disposed around the connecting member of the piston head to form a continuous seal therebetween. The piston head is formed of a pair of axially spaced-apart first and second circular plate members which are connected by the connecting member. The second circular plate member is formed of a diameter which is smaller than the diameter of the first circular plate member so as to allow the outer peripheral portion of the lip seal member to collapse and become disengaged from the inner peripheral sidewall of the housing member.

While there has been illustrated and described what are at present considered to be preferred embodiments of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiments disclosed as the best modes contemplated for carrying out the invention, but that the invention will include all embodiments falling within the scope of the appended claims.

What is claimed is:

1. An air damper assembly for controlling the dampening rate of an openable object, comprising:

a housing having a closed end and an open end;

a piston movably disposed in a reciprocal manner within said housing and including at one end thereof a piston rod projecting outwardly from said open end of said housing, and including at an opposite end thereof a piston head which is telescopically slidable within said housing so as to divide said housing into a head chamber and a rod chamber;

spring means disposed within said housing and interposed between said closed end of said housing and said piston head of said piston so as to bias said piston in an outward direction with respect to said housing;

annular seal means disposed about said piston for engaging an interior peripheral portion of said housing when said piston rod is moved in said outward direction with respect to said housing, and for disengaging said interior peripheral portion of said housing when said piston rod is moved in an inward direction with respect to said housing;

orifice means defined within said piston and operatively associated with said annular seal means for providing a first flow of air from said rod chamber to said head chamber, when said piston is moved in said outward direction with respect to said housing and said annular seal means is engaged with said interior peripheral portion of said housing, so as to control movement of said piston rod out from said housing at a first dampened rate of speed, and for providing a second flow of air from said head chamber to said rod chamber, along with a flow of air bypassing said annular seal means between said annular seal means and said interior peripheral portion of said housing, when said piston is moved in said inward direction with respect to said housing and said annular seal means is disengaged from said interior peripheral portion of said housing, so as to facilitate movement of said piston rod into said housing at a second higher rate of speed;

first latch means provided upon said piston rod for latching said piston rod at an inward position with respect to said housing; and second latch means having a first portion slidably mounted upon said housing and a second portion operatively engaged with said first latch means of said piston rod for releasably latching said piston rod at said inward position of said piston rod with respect to said housing.

2. An air damper assembly as claimed in claim 1, wherein:

said first latch means comprises a cam member having a substantially V-shaped portion; and said second latch means comprises a one-piece latching member retained within said V-shaped portion of said cam member when said piston rod is disposed at said inward position, and being unlatched therefrom when said piston rod is pushed slightly inwardly into said housing and then released.

3. An air damper assembly as claimed in claim 2, wherein said second latch means includes a rectangularly-shaped upper body portion and a diamond-shaped lower body portion formed integrally with said upper body portion.

4. An air damper assembly as claimed in claim 3, wherein said upper body portion includes a pair of opposed U-shaped cut-outs which are adapted to slide within a slot formed within a sidewall of said housing.

5. An air damper assembly as claimed in claim 4, wherein said diamond-shaped lower body portion interfaces with and is movably retained for to travel along a latch track formed on said piston rod.

6. The assembly as set forth in claim 1, wherein:

said housing has a substantially cylindrical configuration.

7. The assembly as set forth in claim 1, wherein:

said piston head comprises a pair of axially spaced plate members connected together by an interconnecting shaft portion; and said annular seal means is surroundingly disposed about said interconnecting shaft portion.

8. An air damper assembly as claimed in claim 7, wherein:

said annular seal means has a closed end and an open end, said closed end abutting a first one of said plate members and said open end abutting a second one of said plate members.

9. The assembly as set forth in claim 7, wherein said orifice means comprises:

a first orifice formed within a first one of said pair of axially spaced plates;

a second orifice formed within a second one of said pair of axially spaced plates; and a substantially U-shaped slot formed within said interconnecting shaft portion and fluidically connecting said first and second orifices to each other.

10. The assembly as set forth in claim 7, wherein:

the diametrical extent of one of said pair of axially spaced plate members of said piston head is less than the diametrical extent of the other one of said pair of axially spaced plate members so as to allow an outer peripheral portion of said annular seal means to collapse radially inwardly when said annular seal means is disengaged from said interior peripheral portion of said housing.

11. The assembly as set forth in claim 1, further comprising:

an end cap removably mounted upon said open end of said housing and having an opening defined therein for permitting said piston rod to extend therethrough.

12. An air damper assembly for controlling the dampening rate of an openable object, comprising:

a housing having a closed end and an open end;

a piston movably disposed in a reciprocal manner within said housing and including at one end thereof a piston rod projecting outwardly from said open end of said housing, and including at an opposite end thereof a piston head which is telescopically slidable within said housing so as to divide said housing into a head chamber and a rod chamber;

spring means disposed within said housing and about said piston rod so as to be interposed between said piston head and said open end of said housing and thereby resist the outward movement of said piston rod with respect to said housing;

annular seal means disposed about said piston for engaging an interior peripheral portion of said housing when said piston rod is moved in said outward direction with respect to said housing, and for disengaging said interior peripheral portion of said housing when said piston rod is moved in an inward direction with respect to said housing;

orifice means defined within said piston and operatively associated with said annular seal means for providing a first flow of air from said rod chamber to said head chamber, when said piston is moved in said outward direction with respect to said housing and said annular seal means is engaged with said interior peripheral portion of said housing, so as to control movement of said piston rod out from said housing at a first dampened rate of speed, and for providing a second flow of air from said head chamber to said rod chamber, along with a flow of air bypassing said annular seal means between said annular seal means and said interior peripheral portion of said housing, when said piston is moved in said inward direction with respect to said housing and said annular seal means is disengaged from said interior peripheral portion of said housing, so as to facilitate movement of said piston rod into said housing at a second higher rate of speed;

first latch means provided upon said piston rod for latching said piston rod at an inward position with respect to said housing; and second latch means having a first portion slidably mounted upon said housing and a second portion operatively engaged with said first latch means of said piston rod for releasably latching said piston rod at said inward position of said piston rod with respect to said housing.

13. An air damper assembly as claimed in claim 12, wherein:

said annular seal means has a closed end and an open end, said closed end abutting a first one of said plate members and said open end abutting a second one of said plate members.

14. An air damper assembly as claimed in claim 12, wherein:

said first latch means comprises a cam member having a substantially V-shaped portion; and said second latch means comprises a one-piece latching member retained within said V-shaped portion of said cam member when said piston rod is disposed at said inward position, and being unlatched therefrom when said piston rod is pushed slightly inwardly into said housing and then released.

15. An air damper assembly as claimed in claim 14, wherein said second latch means includes a rectangularly-shaped upper body portion and a diamond-shaped lower body portion formed integrally with said upper body portion.

16. An air damper assembly as claimed in claim 15, wherein said upper body portion includes a pair of opposed U-shaped cut-outs which are adapted to slide within a slot formed within a sidewall of said housing.

17. An air damper assembly as claimed in claim 16, wherein said diamond-shaped lower body portion interfaces with and is movably retained for travel along a latch track formed on said piston rod.

18. The assembly as set forth in claim 12, wherein:

said housing has a substantially cylindrical configuration.

19. The assembly as set forth in claim 12, wherein:

said piston head comprises a pair of axially spaced plate members connected together by an interconnecting shaft portion; and said annular seal means is surroundingly disposed about said interconnecting shaft portion.

20. The assembly as set forth in claim 19, wherein said orifice means comprises:

a first orifice formed within a first one of said pair of axially spaced plates;

a second orifice formed within a second one of said pair of axially spaced plates; and a substantially U-shaped slot formed within said interconnecting shaft portion and fluidically connecting said first and second orifices to each other.

21. The assembly as set forth in claim 19, wherein:

the diametrical extent of one of said pair of axially spaced plate members of said piston head is less than the diametrical extent of the other one of said pair of axially spaced plate members so as to allow an outer peripheral portion of said annular seal means to collapse radially inwardly when said annular seal means is disengaged from said interior peripheral portion of said housing.

22. The assembly as set forth in claim 12, wherein:

said spring means comprises a coil spring which biases said piston rod in said inward direction with respect to said housing whereby said resistance to said outward movement of said piston rod with respect to said housing assists said orifice means and said annular seal means in achieving said first dampened rate of speed, and said biasing of said piston rod in said inward direction with respect to said housing assists said orifice means and said annular seal means in achieving said second higher rate of speed.

23. An air damper assembly for controlling the dampening rate of an openable object, comprising:

a housing having a closed end and an open end;

a piston movably disposed in a reciprocal manner within said housing and including at one end thereof a piston rod projecting outwardly from said open end of said housing, and including at an opposite end thereof a piston head which is telescopically slidable within said housing so as to divide said housing into a head chaffer and a rod chamber;

spring means disposed within said housing and interposed between said closed end of said housing and said piston head of said piston so as to bias said piston in an outward direction with respect to said housing;

annular seal means disposed about said piston for engaging an interior peripheral portion of said housing when said piston rod is moved in an inward direction with respect to said housing, and for disengaging said interior peripheral portion of said housing when said piston rod is moved in said outward direction with respect to said housing;

orifice means defined within said piston and operatively associated with said annular seal means for providing a first flow of air from said head chamber to said rod chamber, when said piston is moved in said inward direction with respect to said housing and said annular seal means is engaged with said interior peripheral portion of said housing, so as to control movement of said piston rod into said housing at a first dampened rate of speed, and for providing a second flow of air from said rod chamber to said head chamber, along with a flow of air bypassing said annular seal means between said annular seal means and said interior peripheral portion of said housing, when said piston is moved in said outward direction with respect to said housing and said annular seal means is disengaged from said interior peripheral portion of said housing, so as to facilitate movement of said piston rod out from said housing at a second higher rate of speed; first latch means provided upon said piston rod for latching said piston rod at an inward position with respect to said housing; and second latch means having a first portion slidably mounted upon said housing and a second portion operatively engaged with said first latch means of said piston rod for releasably latching said piston rod at said inward position of said piston rod with respect to said housing.

24. The assembly as set forth in claim 23, wherein:

said first latch means comprises a cam member having a substantially V-shaped portion; and said second latch means comprises a one-piece latching member retained within said V-shaped portion of said cam member when said piston rod is disposed at said inward position, and which is capable of being unlatched therefrom when said piston rod is pushed slightly inwardly into said housing and then released.

25. The assembly as set forth in claim 24, wherein:

said housing has a slot formed within a sidewall portion thereof;

said piston rod is provided with a latch track operatively associated with said cam member; and said one-piece latching member of said second latch means comprises a substantially rectangularly-shaped upper body portion having a substantially H-shaped cross-sectional configuration for slidable movement within said slot formed within said sidewall portion of said housing, and a diamond-shaped lower body portion formed integrally with said upper body portion and slidably engaged with said latch track of said piston rod.

26. The assembly as set forth in claim 23, wherein:

said spring means comprises a coil spring which is axially compressed as said piston rod is moved in said inward direction with respect to said housing whereby resistance to said inward movement of said piston rod with respect to said housing assists said orifice means and said annular seal means in achieving said first dampened rate of speed, and said biasing of said piston rod in said outward direction with respect to said housing assists said orifice means and said annular seal means in achieving said second higher rate of speed.

27. An air damper assembly for controlling the dampening rate of an openable object, comprising:

a housing having a closed end and an open end;

a piston movably disposed in a reciprocal manner within said housing and including at one end thereof a piston rod projecting outwardly from said open end of said housing, and including at an opposite end thereof a piston head which is telescopically slidable within said housing so as to divide said housing into a head chamber and a rod chamber;

spring means disposed within said housing and about said piston rod so as to be interposed between said piston head and said open end of said housing and thereby resist the outward movement of said piston rod with respect to said housing;

annular seal means disposed about said piston for engaging an interior peripheral portion of said housing when said piston rod is moved in an inward direction with respect to said housing, and for disengaging said interior peripheral portion of said housing when said piston rod is moved in said outward direction with respect to said housing;

orifice means defined within said piston and operatively associated with said annular seal means for providing a first flow of air from said head chamber to said rod chamber, when said piston is moved in said inward direction with respect to said housing and said annular seal means is engaged with said interior peripheral portion of said housing, so as to control movement of said piston rod into said housing at a first dampened rate of speed, and for providing a second flow of air from said rod chamber to said head chamber, along with a flow of air bypassing said annular seal means between said annular seal means and said interior peripheral portion of said housing, when said piston is moved in said outward direction with respect to said housing and said annular seal means is disengaged from said interior peripheral portion of said housing, so as to facilitate movement of said piston rod out from said housing at a second higher rate of speed;

first latch means provided upon said piston rod for latching said piston rod at an inward position with respect to said housing; and second latch means having a first portion slidably mounted upon said housing and a second portion operatively engaged with said first latch means of said piston rod for releasably latching said piston rod at said inward position of said piston rod with respect to said housing.

28. The assembly as set forth in claim 27, wherein:

said first latch means comprises a cam member having a substantially V-shaped portion; and said second latch means comprises a one-piece latching member retained within said V-shaped portion of said cam member when said piston rod is disposed at said inward position, and which is capable of being unlatched therefrom when said piston rod is pushed slightly inwardly into said housing and then released.

29. The assembly as set forth in claim 28, wherein:

said housing has a slot formed within a sidewall portion thereof;

said piston rod is provided with a latch track operatively associated with said cam member; and said one-piece latching member of said second latch means comprises a substantially rectangularly-shaped upper body portion having a substantially H-shaped cross-sectional configuration for slidable movement within said slot formed within said sidewall portion of said housing, and a diamond-shaped lower body portion formed integrally with said upper body portion and slidably engaged with said latch track of said piston rod.

30. The assembly as set forth in claim 27, wherein:

said spring means comprises a coil spring which biases said piston rod in said inward direction with respect to said housing whereby said biasing of said piston rod in said inward direction with respect to said housing cooperates with said orifice means and said annular seal means in achieving said first dampened rate of speed in a controlled manner, and said resistance to said outward movement of said piston rod with respect to said housing assists said orifice means and said annular seal means in achieving said second higher rate of speed in a controlled manner.

* * * * *